(12) United States Patent
Shin et al.

(10) Patent No.: US 10,663,018 B2
(45) Date of Patent: May 26, 2020

(54) HYDRAULIC CONTROL SYSTEM OF DOUBLE PISTON CLUTCH UNIT FOR AUTOMATIC TRANSMISSION

(71) Applicants: Hyundai Motor Company, Seoul (KR); Kia Motors Corporation, Seoul (KR)

(72) Inventors: Yong Uk Shin, Whasung-Si (KR); Minho Chae, Whasung-Si (KR); Chon Ok Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 139 days.

(21) Appl. No.: 16/037,130

(22) Filed: Jul. 17, 2018

(65) Prior Publication Data

US 2019/0186559 A1    Jun. 20, 2019

(30) Foreign Application Priority Data

Dec. 18, 2017   (KR) .......................... 10-2017-0174552

(51) Int. Cl.
  *F16D 48/02*    (2006.01)
  *F16D 25/0638*    (2006.01)

(52) U.S. Cl.
  CPC ......... *F16D 48/02* (2013.01); *F16D 25/0638* (2013.01); *F16D 25/14* (2013.01); *F16D 2048/0212* (2013.01); *F16D 2048/0221* (2013.01)

(58) Field of Classification Search
  None
  See application file for complete search history.

(56) References Cited

U.S. PATENT DOCUMENTS

| | | | |
|---|---|---|---|
| 5,511,644 A * | 4/1996 | Murata | F16D 13/52 192/109 F |
| 5,950,787 A * | 9/1999 | Murasugi | F16D 25/06 192/85.25 |
| 6,030,310 A | 2/2000 | Greenwood et al. | |
| 7,104,380 B2 * | 9/2006 | Bishop | F16D 25/0638 192/109 F |
| 7,210,501 B2 | 5/2007 | Neff et al. | |

(Continued)

*Primary Examiner* — Mark A Manley
(74) *Attorney, Agent, or Firm* — Morgan, Lewis & Bockius LLP (57) ABSTRACT

A hydraulic control system of double piston clutch device configured for an automatic transmission, which includes clutch drum connected to one rotation element, a clutch configured in the clutch drum and configured to transmit rotation power in connection with another rotation element through a clutch hub, and a double piston in which first and second pistons are disposed in series to operate the clutch by hydraulic pressure while a front end is disposed to correspond to the clutch, may include a first hydraulic chamber formed between the first piston and the clutch drum to receive the hydraulic pressure through a first passage hole in a sealed state; and a second hydraulic chamber formed between the first and second pistons to receive the hydraulic pressure through a second passage hole in the sealed state and the hydraulic pressure separately controlled is supplied to the first and second hydraulic chambers, respectively.

12 Claims, 5 Drawing Sheets

(56) References Cited

U.S. PATENT DOCUMENTS

| | | | |
|---|---|---|---|
| 7,604,566 B2* | 10/2009 | Dickinson | F16H 61/143 |
| | | | 192/3.31 |
| 7,677,997 B2 | 3/2010 | Hiramatsu et al. | |
| 9,010,374 B2 | 4/2015 | Burkhart et al. | |
| 2008/0314711 A1* | 12/2008 | Jayaram | F16D 25/0638 |
| | | | 192/85.34 |

* cited by examiner

HYDRAULIC CONTROL SYSTEM OF DOUBLE PISTON CLUTCH UNIT FOR AUTOMATIC TRANSMISSION

CROSS-REFERENCE TO RELATED APPLICATION

The present application claims priority to Korean Patent Application No. 10-2017-0174552 filed on Dec. 18, 2017, the entire contents of which is incorporated herein for all purposes by this reference.

BACKGROUND OF THE INVENTION

Field of the Invention

The present invention relates to a double piston clutch device configured for an automatic transmission, and more particularly, to a hydraulic control system of a double piston clutch device configured for an automatic transmission, which is applied to a double piston clutch and controls oil pressure to provide optimized gap control and coupling force between frictional materials for each operation interval.

Description of Related Art

Eco-friendly technology in vehicles is a core technology with survival of a future vehicle industry and recently, as exhaust gas regulations have been intensified, automakers are concentrating on developing eco-friendly vehicles through environmental regulation and fuel efficiency improvement.

To achieve such a fuel efficiency improvement goal, various studies have been actively conducted, such as high-efficiency engines, high-efficiency transmissions, and light-weight vehicle bodies. Especially, in a field of a transmission, a double clutch transmission in which efficiency of a manual transmission and convenience of an automatic transmission are combined, an automated manual transmission, and the like have been actively developed.

The transmissions transmit rotational force and torque of an engine through a dry or wet clutch and since clutches applied to the double clutch transmission and the automated manual transmission transmit the engine torque directly transmitted from the engine without passing through a torque converter such as the clutch the automatic transmission, large coupling force and control precision are required.

In other words, the clutches for the double clutch transmission and the automated manual transmission require a fast operation speed of a piston for rapid power transmission to an initial coupling interval between a clutch disk and a clutch plate, which is the frictional material and after the clutch disk and the clutch plate are coupled to each other, at the start of power transmission, larger coupling force for the power transmission is required rather than the rapid operation speed is required.

From such a viewpoint, the clutch that transmits recent rotational force satisfies both the rapid operating speed of the piston and a condition of the large coupling force. However, even though the rapid operating speed of the piston and the large coupling force are not required at the same time, the rapid operating speed and the large coupling force are not precisely controlled for each operation interval, and as a result, overall operating efficiency of the clutch is reduced.

Furthermore, since the large coupling force and the rapid operating speed of the piston are repeatedly applied to the clutch plate, there is a disadvantage that the clutch is damaged by accumulated fatigue.

Therefore, in recent years, there has been a tendency to develop a technology for securing gap control and coupling force between the frictional materials by applying a double piston which is operated sequentially for driving a power transmission mechanism such as a clutch and a brake. Effective hydraulic control technology is required for operating the double piston.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hydraulic control system of a double piston clutch device configured for an automatic transmission, which conducts more precise torque control between frictional materials as a double piston operates stepwise even though piston hydraulic control of the double piston clutch device is controlled in a form of linear pressure.

The present invention, in various aspects, has also been made in an effort to provide a hydraulic control system of a double piston clutch device configured for an automatic transmission, which enhances clutch controllability and enhance hydraulic responsiveness which acts on a double piston by minimizing the number of valves involved in pressure switching of the double piston.

Various aspects of the present invention are directed to providing a hydraulic control system of a double piston clutch device configured for an automatic transmission, which may include clutch drum connected to one rotation element, a clutch configured in the clutch drum and configured to transmit rotation power with reference to the other one rotation element through a clutch hub, and a double piston in which first and second pistons are disposed in series to operate the clutch by hydraulic pressure while a front end portion thereof is disposed to correspond to the clutch, may include: a first hydraulic chamber formed between the first piston and the clutch drum to receive the hydraulic pressure through a first passage hole in a sealed state; and a second hydraulic chamber formed between the first and second pistons to receive the hydraulic pressure through a second passage hole in the sealed state, in which the hydraulic pressure which is separately controlled is supplied to the first and second hydraulic chambers, respectively.

Furthermore, the hydraulic pressure controlled by a solenoid valve may be configured to be directly supplied to the first hydraulic chamber and the hydraulic pressure controlled by the solenoid valve and thereafter, variably controlled by a first switch valve may be configured to be supplied to the second hydraulic chamber.

Herein, the hydraulic pressure may be configured by line pressure or clutch supply pressure.

Furthermore, the solenoid valve may be configured by an N/L type variable control solenoid valve in which the hydraulic pressure is not formed in a normal state.

Furthermore, the first switch valve may be configured by a spool valve and may be configured to be controlled by control pressure of the solenoid valve, which is applied to one end portion and elastic force of an elastic member, which is applied to an opposite side against the control pressure of the solenoid valve.

Meanwhile, the hydraulic pressure controlled by the solenoid valve may be configured to be directly supplied to the first hydraulic chamber and the hydraulic pressure variably controlled by the first switch valve may be configured to be directly supplied to the second hydraulic chamber.

Herein, the hydraulic pressure may be configured by the line pressure or clutch supply pressure.

Furthermore, the solenoid valve may be configured by the N/L type variable control solenoid valve in which the hydraulic pressure is not formed in the normal state.

Furthermore, the first switch valve may be configured by a spool valve and may be configured to be controlled by control pressure of the solenoid valve, which is applied to one end portion and elastic force of an elastic member, which is applied to an opposite side against the control pressure of the solenoid valve.

Meanwhile, hydraulic pressure variably controlled by a second switch valve may be configured to be directly supplied to the first hydraulic chamber and the hydraulic pressure controlled by the second switch valve and thereafter, variably controlled by the first switch valve may be configured to be supplied to the second hydraulic chamber.

Herein, the hydraulic pressure may be configured by the line pressure or clutch supply pressure.

Furthermore, the second switch valve may be configured by the spool valve, and may be configured to be controlled by the control pressure and feedback control pressure of the solenoid valve, which are applied to one end portion and the elastic force of the elastic member, which is applied to the opposite side against the control pressure and the feedback control pressure of the solenoid valve.

In the instant case, the solenoid valve may be configured by the N/L type variable control solenoid valve in which the hydraulic pressure is not formed in the normal state.

Furthermore, the first switch valve may be configured by the spool valve, and may be configured to be controlled by the control pressure of the second switch valve, which are applied to one end portion and the elastic force of the elastic member, which is applied to the opposite side against the control pressure of the second switch valve.

Meanwhile, the hydraulic pressure variably controlled by the second switch valve may be configured to be directly supplied to the first hydraulic chamber and the hydraulic pressure variably controlled by the first switch valve may be configured to be directly supplied to the second hydraulic chamber.

Herein, the hydraulic pressure may be configured by the line pressure or clutch supply pressure.

Furthermore, the second switch valve may be configured by the spool valve, and may be configured to be controlled by the control pressure and feedback control pressure of the solenoid valve, which are applied to one end portion and the elastic force of the elastic member, which is applied to the opposite side against the control pressure and the feedback control pressure of the solenoid valve.

In the instant case, the solenoid valve may be configured by the N/L type variable control solenoid valve in which the hydraulic pressure is not formed in the normal state.

Furthermore, the first switch valve may be configured by the spool valve, and may be configured to be controlled by the control pressure of the second switch valve, which are applied to one end portion and the elastic force of the elastic member, which is applied to the opposite side against the control pressure of the second switch valve.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described in detail with reference to the accompanying drawings.

Figure 1:
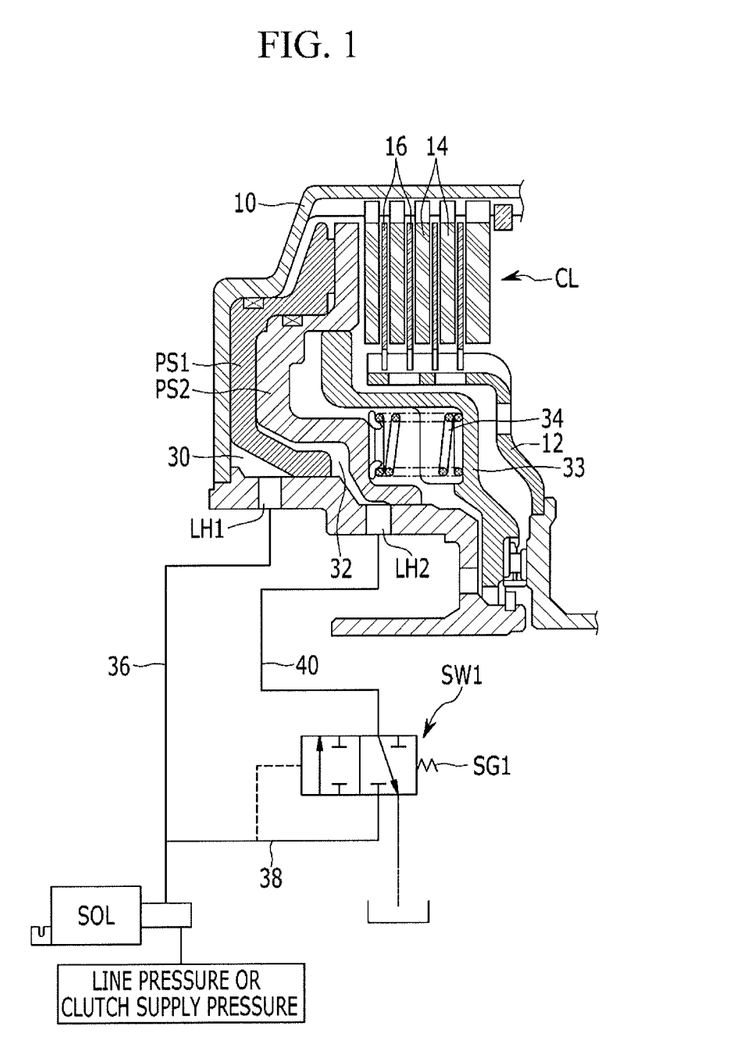
FIG. 1 is a hydraulic circuit diagram illustrating a configuration of a double piston clutch device configured for an automatic transmission and a hydraulic control system according to various exemplary embodiments of the present invention.

FIG. 1 is a hydraulic circuit diagram illustrating a configuration of a double piston clutch device configured for an automatic transmission and a hydraulic control system according to various exemplary embodiments of the present invention.

Referring to FIG. 1, a double piston clutch CL according to the various exemplary embodiments of the present invention may include a clutch drum 10, a clutch hub 12, a plurality of clutch plates 14, and a plurality of clutch disks 16, and a double piston including first and second pistons PS1 and PS2.

In the double piston clutch CL, the plurality of clutch plates 14 is spline-coupled to an internal diameter portion of the clutch drum 10 and the plurality of clutch disks 16 disposed among the clutch plates 14 is spline-coupled to an external diameter portion of the clutch hub 12.

In the double piston, the first and second pistons PS1 and PS2 are dually disposed inside the clutch drum 10 in series, a first hydraulic chamber 30 is formed between the clutch drum 10 and the first piston PS1 in a sealed state, and a second hydraulic chamber 32 is formed between the first piston PS1 and the second piston PS2 in the sealed state.

A return spring 34 supported by a spring retainer 33 is disposed on an internal circumferential side opposite to the second hydraulic chamber 32 to provide an elastic force in a direction to continuously return the first and second pistons PS1 and PS2.

As a result, when hydraulic pressure is supplied to the first hydraulic chamber 30 through a first passage hole LH1, the first and second pistons PS1 and PS2 advances to the clutch plate 14 while overcoming the elastic force of the return spring 34 to cause friction between the clutch plate 14 and the clutch disk 16, controlling a gap between frictional materials of the double piston clutch CL.

Furthermore, when the hydraulic pressure is supplied to both the first and second hydraulic chambers 30 and 32 through the first and second oil passage holes LH1 and LH2, the second piston PS2 further advances to the clutch plate 14 while overcoming the elastic force of the return spring 34 to press the clutch plate 14 and the clutch disk 16 and form coupling force with larger pressure, operating the double piston clutch CL.

The hydraulic pressure supplied to the first and second hydraulic chambers 30, which is separately controlled for each of the first and second hydraulic chambers 30 and 32 is supplied to operate the double piston clutch CL.

In the instant case, the hydraulic pressure adopts line pressure or clutch supply pressure as a source and a hydraulic control system according to the various exemplary embodiments of the present invention adopts one solenoid valve SOL and a first switch valve SW1 to separately control the hydraulic pressure and supply the controlled hydraulic pressure to each of the hydraulic chambers 30 and 32.

That is, the hydraulic control system controls control pressure of the solenoid valve for controlling the line pressure or clutch supply pressure to be supplied to the first hydraulic chamber 30 through a first passage 36.

Furthermore, the first switch valve SW1 controls the hydraulic pressure supplied through a second passage 38 branched from the first passage 36 to be supplied to the second hydraulic chamber 32 through a third passage 40.

Herein, the solenoid valve SOL may be configured by an N/L type variable control solenoid valve that does not form the hydraulic pressure in a normal state.

The first switch valve SW1 may include a spool valve and is configured to be variably controlled by the control pressure of the solenoid valve, which is applied to one end portion and elastic force of an elastic member SG1, which is applied to an opposite side against the control pressure of the solenoid valve SOL.

Figure 2:
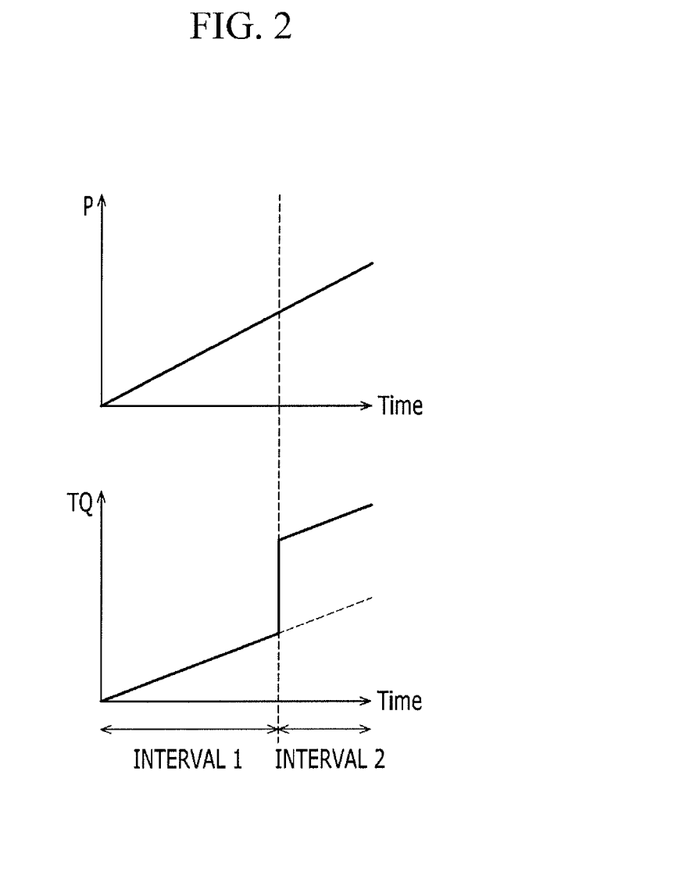
FIG. 2 is a graph for describing an action effect of the hydraulic control system of a double piston clutch device configured for an automatic transmission according to the various exemplary embodiments of the present invention.

FIG. 2 is a graph for describing an action effect of the hydraulic control system of a double piston clutch device configured for an automatic transmission according to the various exemplary embodiments of the present invention.

Referring to FIG. 2, when "P" represents pressure controlled by a solenoid valve SOL and "TQ" represents transmission torque to the double piston clutch CL, interval 1 as an interval in which the hydraulic pressure is supplied to the first piston PS1 before the first switch valve SW1 is switched is a slip control and clutch kiss point control interval, that is, a shift control interval in which precise control is available with a low slope.

Interval 2 as an interval in which the first switch valve SW1 is switched and the hydraulic pressure is supplied to both the first and second pistons PS1 and PS2 is an interval in which the transmission torque is rapidly increased to transmit lock-up power.

Figure 3:
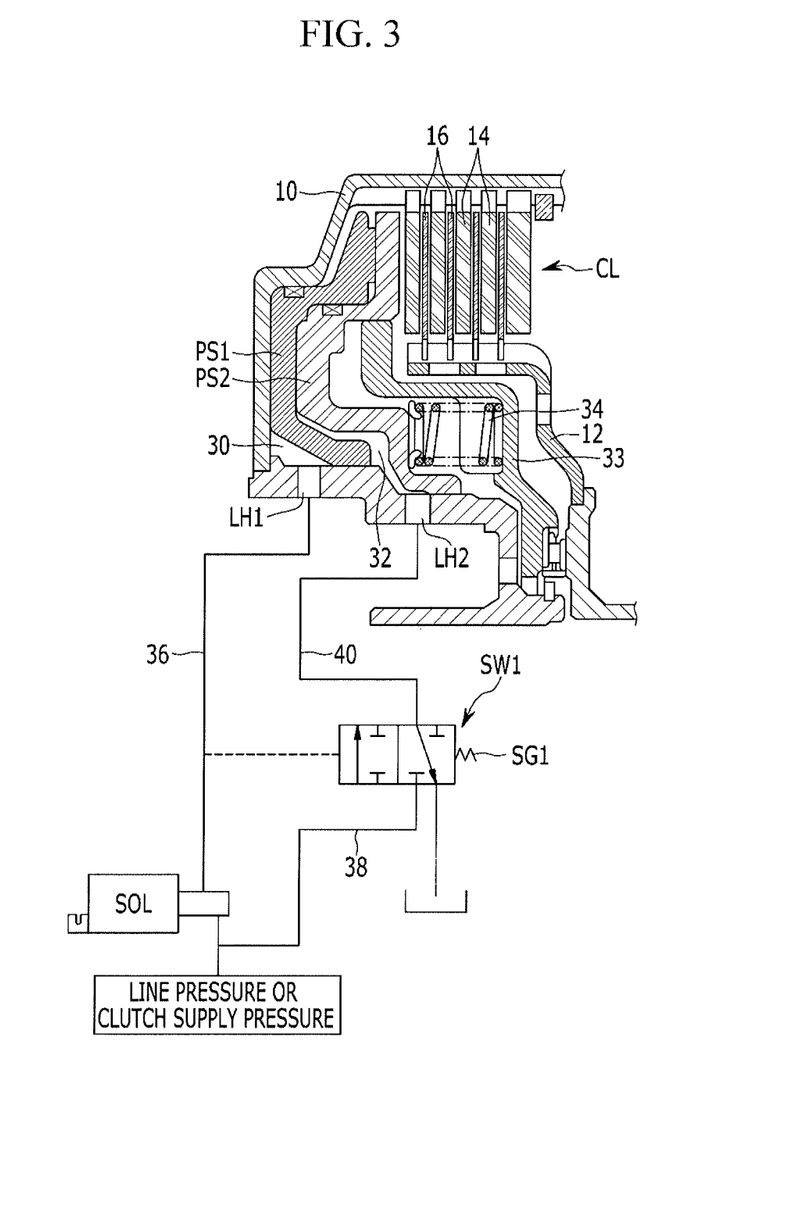
FIG. 3 is a hydraulic circuit diagram illustrating a configuration of a double piston clutch device configured for an automatic transmission and a hydraulic control system according to various exemplary embodiments of the present invention.

FIG. 3 is a hydraulic circuit diagram illustrating a configuration of a double piston clutch device configured for an automatic transmission and a hydraulic control system according to various exemplary embodiments of the present invention.

Referring to FIG. 3, the double piston clutch CL according to the various exemplary embodiments is configured in the same manner as in the various exemplary embodiments of the present invention, except that only a control method by the hydraulic control system is configured differently.

That is, in the control method of the hydraulic control system according to the various exemplary embodiments of the present invention, the hydraulic pressure controlled by the solenoid valve SOL and the first switch valve SW1 is supplied to the second hydraulic chamber 32, but in the hydraulic control system according to the various exemplary embodiments of the present invention, the control pressure of the solenoid valve SOL is directly supplied to the first hydraulic chamber 30 via the first passage 30 and the hydraulic pressure of the second passage 38 through which the line pressure or the clutch supply pressure is supplied is controlled by the first switch valve SW1 and supplied to the second hydraulic chamber 32 through a third passage 40.

The first switch valve SW1 is controlled by the control pressure of the solenoid valve SOL, which is applied on one end portion and the elastic force of the elastic member SG1, which is applied to the other side against the control pressure of the solenoid valve SOL similarly to the various exemplary embodiments and the various exemplary embodiments is different from the various exemplary embodiments only in that hydraulic pressure to be controlled is the line pressure or the clutch supply pressure and an action effect of the various exemplary embodiments is the same as that of the various exemplary embodiments of the present invention, therefore the detailed description thereof will be omitted.

Figure 4:
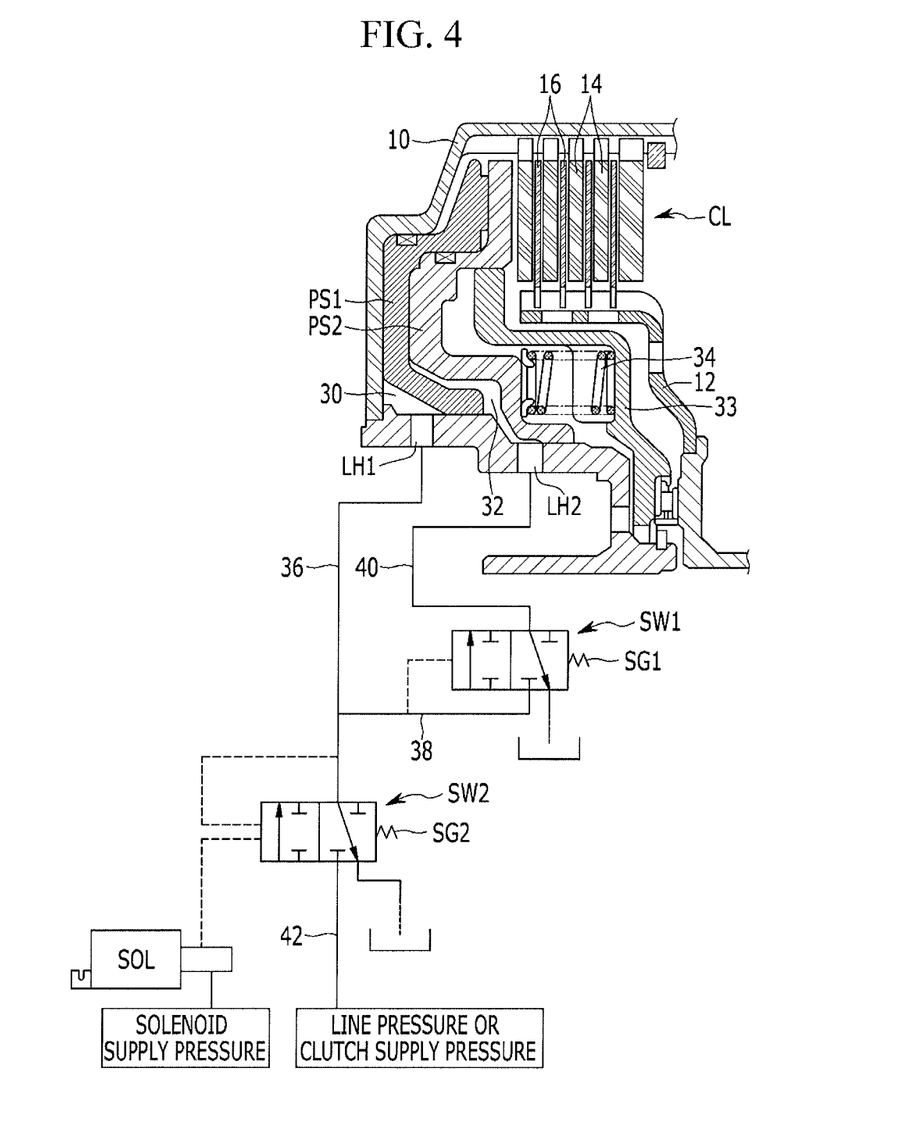
FIG. 4 is a hydraulic circuit diagram illustrating a configuration of a double piston clutch device configured for an automatic transmission and a hydraulic control system according to various exemplary embodiments of the present invention.

FIG. 4 is a hydraulic circuit diagram illustrating a configuration of a double piston clutch device configured for an automatic transmission and a hydraulic control system according to various exemplary embodiments of the present invention.

Referring to FIG. 4, the double piston clutch CL according to the various exemplary embodiments is configured in the same manner as in the various exemplary embodiments of the present invention, except that only the control method by the hydraulic control system is configured differently.

That is, in the control method of the hydraulic control system according to the various exemplary embodiments of the present invention, the hydraulic pressure controlled by the solenoid valve SOL and the first switch valve SW1 is supplied to the second hydraulic chamber 32, but in the hydraulic control system according to the various exemplary embodiments of the present invention, the second switch valve SW2 is disposed on an upstream side of the first switch valve SW1.

As a result, the line pressure or the clutch supply pressure supplied through a fourth oil passage 42 is controlled by the second switch valve SW2 to be supplied to the first hydraulic chamber 30 through the first passage 36 and the hydraulic pressure supplied through the second passage 38 branched from the first passage 36 is controlled by the first switch valve SW1 to be supplied through the third passage 40.

Accordingly, the first switch valve SW1 is controlled by the hydraulic pressure of the second passage 38, which is applied to one end portion and the elastic force of the elastic member SG1, which is applied to the opposite side against the hydraulic pressure of the second passage 38.

Furthermore, the second switch valve SW2 is controlled by the control pressure of the solenoid valve SOL and the hydraulic pressure (feedback hydraulic pressure) of the first passage 36, which are applied to one end portion and the control pressure of the solenoid valve SOL and the elastic force of an elastic member SG2, which are applied to the opposite side against the control pressure of the solenoid valve SOL and the hydraulic pressure (feedback hydraulic pressure) of the first passage 36.

Figure 5:
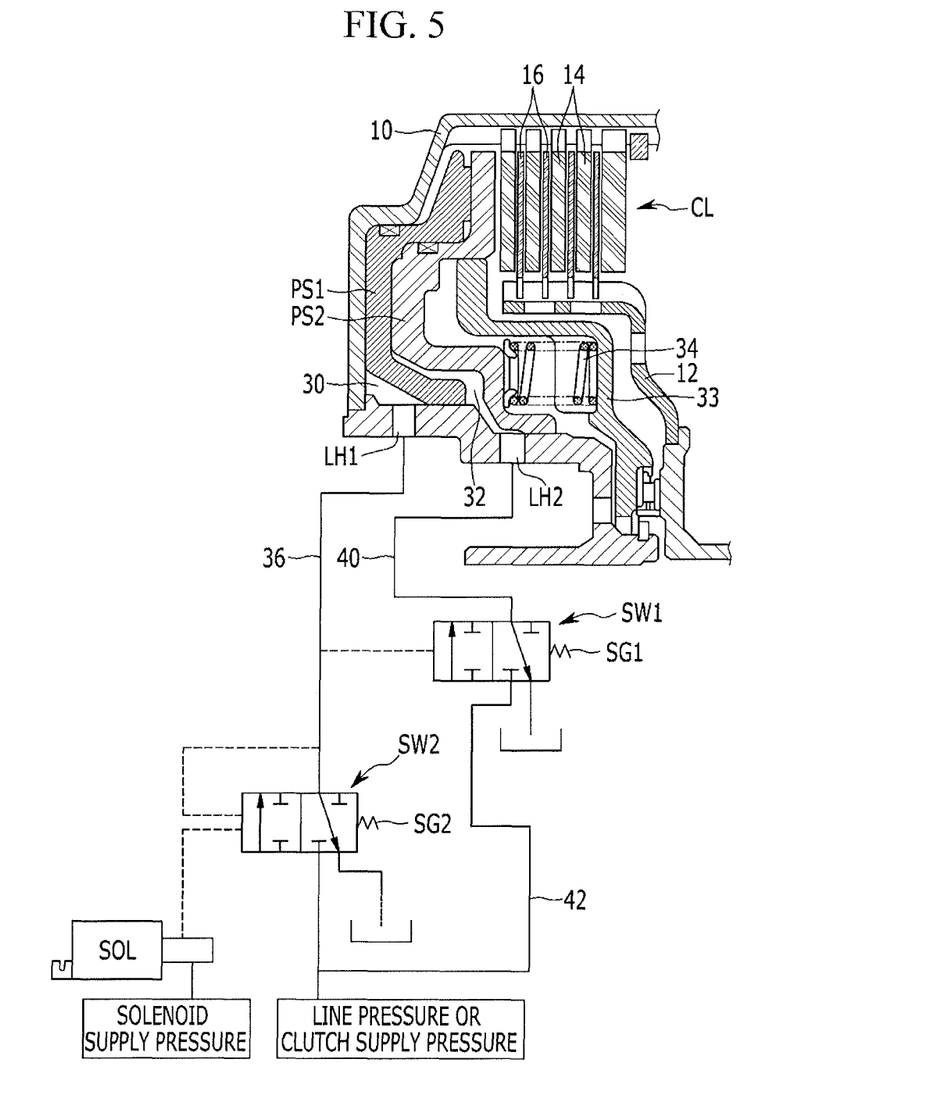
FIG. 5 is a hydraulic circuit diagram illustrating a configuration of a double piston clutch device configured for an automatic transmission and a hydraulic control system according to various exemplary embodiments of the present invention.

FIG. 5 is a hydraulic circuit diagram illustrating a configuration of a double piston clutch device configured for an automatic transmission and a hydraulic control system according to various exemplary embodiments of the present invention.

Referring to FIG. 5, the double piston clutch CL according to the various exemplary embodiments is configured in the same manner as in the various exemplary embodiments of the present invention, except that only the control method by the hydraulic control system is configured differently.

That is, in the control method of the hydraulic control system according to the various exemplary embodiments of the present invention, the line pressure or the clutch supply pressure supplied through the fourth passage 42 is controlled by the second switch valve SW2 to be supplied to the first hydraulic chamber 30 through the first passage 36 and the hydraulic pressure supplied through the second passage 38 branched from the first passage 36 is controlled by the first switch valve SW1 to be supplied through the third passage 40, but in the hydraulic control system according to the various exemplary embodiments of the present invention, the hydraulic pressure controlled by the second switch valve SW2 is directly supplied to the first hydraulic chamber 30 through the first passage 36 and the hydraulic pressure controlled by the first switch valve SW1 is directly supplied to the second hydraulic chamber 32 through the third passage 40.

Accordingly, the first switch valve SW1 is controlled by the hydraulic pressure of the first passage 36, which is applied to one end portion and the elastic force of the elastic member SG1, which is applied to the opposite side against the hydraulic pressure of the first passage 36.

Furthermore, the second switch valve SW2 is controlled by the control pressure of the solenoid valve SOL and the hydraulic pressure (feedback hydraulic pressure) of the first passage 36, which are applied to one end portion and the control pressure of the solenoid valve SOL and the elastic force of an elastic member SG2, which are applied to the opposite side against the control pressure of the solenoid valve SOL and the hydraulic pressure (feedback hydraulic pressure) of the first passage 36.

As a result, as compared with the various exemplary embodiments of the present invention, except that the line pressure or the clutch supply pressure supplied through the fourth passage 42 is controlled by the first switch valve SW1 to be supplied to the second hydraulic chamber 32 through the third passage 40, since the various exemplary embodiments is the same as the various exemplary embodiments of the present invention, the detailed description thereof will be omitted.

The hydraulic control system according to the first, second, third, and various exemplary embodiments of the present invention has been referred to as an example for controlling the hydraulic pressure of the double piston clutch in which the double piston is applied to the clutch, but the hydraulic control system may be applied to a double piston brake in which the double piston is applied to the brake.

In the hydraulic control system according to the exemplary embodiment of the present invention, the piston hydraulic control of the double piston clutch CL is conducted in a form of linear pressure, but the operation of each of the pistons PS1 and PS2 is performed stepwise to more precisely control the torque between the frictional materials.

Meanwhile, the controllability of the double piston clutch CL may be enhanced by minimizing the number of valves involved in pressure switching of each of the pistons PS1 and PS2 and passage resistance is reduced by simplifying a passage structure to improve hydraulic responsiveness.

Furthermore, since sequential hydraulic control may be achieved by applying the hydraulic control system to a double piston structure in which two pistons PS1 and PS2, a lot of hydraulic pressure need not be charged is not charged at a time, enhancing the hydraulic responsiveness.

Furthermore, since the double pistons PS1 and PS2 are controlled in sequence, it is possible to perform a quick operation even with low transmission torque in a gap control interval between the frictional materials and in an interval where the coupling force between the frictional materials is required, sufficient coupling force may be secured with high transmission torque, increasing control precision of the clutch.

Furthermore, since the hydraulic control system according to the exemplary embodiment of the present invention may be formed with fewer components, cost competitiveness may be increased.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic control system of a double piston clutch device for an automatic transmission, which includes clutch drum connected to one rotation element, a clutch configured in the clutch drum and configured to transmit rotation power in connection with another rotation element through a clutch hub, and a double piston in which first and second pistons are disposed in series to operate the clutch by hydraulic pressure while a front end portion thereof is disposed to correspond to the clutch, the hydraulic control system comprising:
   a first hydraulic chamber formed between the first piston and the clutch drum to receive the hydraulic pressure through a first passage hole in a sealed state; and
   a second hydraulic chamber formed between the first and second pistons to receive the hydraulic pressure through a second passage hole in the sealed state,
   wherein the hydraulic pressure which is separately controlled is supplied to the first and second hydraulic chambers, respectively,
   wherein the hydraulic pressure controlled by a solenoid valve is configured to be directly supplied to the first hydraulic chamber and the hydraulic pressure controlled by the solenoid valve and thereafter, variably controlled by a first switch valve is configured to be supplied to the second hydraulic chamber, and
   wherein the first switch valve is configured by a spool valve and is configured to be controlled by control pressure of the solenoid valve, which is applied to one end portion thereof and elastic force of an elastic member, which is applied to an opposite side against the control pressure of the solenoid valve.

2. The hydraulic control system of claim 1, wherein the hydraulic pressure is configured by line pressure or clutch supply pressure.

3. The hydraulic control system of claim 1, wherein the solenoid valve is configured by a normally-low type variable control solenoid valve in which the hydraulic pressure is not formed when the normally-low type variable control solenoid valve is not operated.

4. A hydraulic control system of a double piston clutch device for an automatic transmission, which includes clutch drum connected to one rotation element, a clutch configured in the clutch drum and configured to transmit rotation power in connection with another rotation element through a clutch hub, and a double piston in which first and second pistons are disposed in series to operate the clutch by hydraulic pressure while a front end portion thereof is disposed to correspond to the clutch, the hydraulic control system comprising:
   a first hydraulic chamber formed between the first piston and the clutch drum to receive the hydraulic pressure through a first passage hole in a sealed state; and
   a second hydraulic chamber formed between the first and second pistons to receive the hydraulic pressure through a second passage hole in the sealed state,
   wherein the hydraulic pressure which is separately controlled is supplied to the first and second hydraulic chambers, respectively, and
   wherein the hydraulic pressure variably controlled by a second switch valve is configured to be directly supplied to the first hydraulic chamber and the hydraulic pressure controlled by the second switch valve and thereafter, variably controlled by a first switch valve is configured to be supplied to the second hydraulic chamber.

5. The hydraulic control system of claim 4, wherein the hydraulic pressure is configured by line pressure or clutch supply pressure.

6. The hydraulic control system of claim 4, wherein the second switch valve is configured by a spool valve, and is configured to be controlled by control pressure and feedback control pressure of a solenoid valve, which are applied to one end portion thereof and elastic force of an elastic member, which is applied to the opposite side against the control pressure and the feedback control pressure of the solenoid valve.

7. The hydraulic control system of claim 6, wherein the solenoid valve is configured by a normally-low type variable control solenoid valve in which the hydraulic pressure is not formed when the normally-low type variable control solenoid valve is not operated.

8. The hydraulic control system of claim 4, wherein the first switch valve is configured by a spool valve, and is configured to be controlled by control pressure of the second switch valve, which are applied to one end portion thereof and elastic force of an elastic member, which is applied to the opposite side against the control pressure of the second switch valve.

9. A hydraulic control system of a double piston clutch device for an automatic transmission, which includes clutch drum connected to one rotation element a clutch configured in the clutch drum and configured to transmit rotation power in connection with another rotation element through a clutch hub, and a double piston in which first and second pistons are disposed in series to operate the clutch by hydraulic pressure while a front end portion thereof is disposed to correspond to the clutch, the hydraulic control system comprising:
   a first hydraulic chamber formed between the first piston and the clutch drum to receive the hydraulic pressure through a first passage hole in a sealed state; and
   a second hydraulic chamber formed between the first and second pistons to receive the hydraulic pressure through a second passage hole in the sealed state,
   wherein the hydraulic pressure which is separately controlled is supplied to the first and second hydraulic chambers, respectively,
   wherein the hydraulic pressure variably controlled by a second switch valve is configured to be directly supplied to the first hydraulic chamber and the hydraulic pressure variably controlled by a first switch valve is configured to be directly supplied to the second hydraulic chamber, and
   wherein the first switch valve is configured by a spool valve, and is configured to be controlled by control pressure of the second switch valve, which are applied to one end portion thereof and elastic force of a first elastic member, which is lied to the opposite side against the control pressure of the second switch valve.

10. The hydraulic control system of claim 9, wherein the hydraulic pressure is configured by line pressure or clutch supply pressure.

11. The hydraulic control system of claim 9, wherein the second switch valve is configured by a spool valve, and is configured to be controlled by control pressure and feedback control pressure of a solenoid valve, which are applied to one end portion thereof and elastic force of a second elastic member, which is applied to the opposite side against the control pressure and the feedback control pressure of the solenoid valve.

12. The hydraulic control system of claim 11, wherein the solenoid valve is configured by a normally-low L type variable control solenoid valve in which the hydraulic pressure is not formed when the normally-low type variable control solenoid valve is not operated.

* * * * *